United States Patent
Chui et al.

(10) Patent No.: US 7,924,526 B1
(45) Date of Patent: Apr. 12, 2011

(54) METHOD OF RAMP STOP DETECTION FOR VCM VELOCITY-CONTROLLED RETRACT

(75) Inventors: Siew Yong Chui, Singapore (SG); Edy Susanto, Singapore (SG); Jye Sheng Hong, Singapore (SG)

(73) Assignee: Marvell International Ltd. (BM)

(*) Notice: Subject to any disclaimer, the term of this patent is extended or adjusted under 35 U.S.C. 154(b) by 0 days.

(21) Appl. No.: 12/620,902

(22) Filed: Nov. 18, 2009

Related U.S. Application Data (63) Continuation of application No. 11/595,697, filed on Nov. 10, 2006, now Pat. No. 7,636,220.

(60) Provisional application No. 60/782,257, filed on Mar. 14, 2006.

(51) Int. Cl.
*G11B 21/02* (2006.01)

(52) U.S. Cl. .................................................. 360/75

(58) Field of Classification Search .................. None
See application file for complete search history.

(56) References Cited

U.S. PATENT DOCUMENTS

| | | | |
|---|---|---|---|
| 5,455,723 A | 10/1995 | Boutaghou et al. | |
| 6,040,671 A | 3/2000 | Brito et al. | |
| 6,064,539 A | 5/2000 | Null et al. | |
| 6,363,214 B1 | 3/2002 | Merello et al. | |
| 6,512,650 B1 * | 1/2003 | Tanner | 360/75 |
| 6,563,660 B1 * | 5/2003 | Hirano et al. | 360/75 |
| 6,643,088 B1 | 11/2003 | Kawachi | |
| 6,754,027 B2 | 6/2004 | Hirano et al. | |
| 6,765,746 B2 | 7/2004 | Kusumoto | |
| 7,046,475 B2 * | 5/2006 | Hosokawa | 360/75 |
| 7,133,242 B2 * | 11/2006 | Fujii et al. | 360/75 |
| 7,295,395 B2 | 11/2007 | Koh et al. | |

\* cited by examiner

*Primary Examiner* — K. Wong (57) ABSTRACT

A method and apparatus for controlling the parking of a transducer head in a disk drive. A drive current is provided to a motor which controls movement of the head in a direction to move the head to a parking position. The arrival of the head at the parking position is detected. Upon this detection, a drive stop sequence is initiated to stop providing the drive current a short time after the head reaches the parking position. In one embodiment, it is determined whether the head has reached the parking position by monitoring the back emf (bemf) of the motor controlling the head, typically a voice coil motor (VCM). The detection of a sharp decline in the bemf indicates the head has stopped.

20 Claims, 9 Drawing Sheets

METHOD OF RAMP STOP DETECTION FOR VCM VELOCITY-CONTROLLED RETRACT

CROSS-REFERENCES TO RELATED APPLICATIONS

This application is a continuation application of commonly-assigned U.S. patent application Ser. No. 11/595,697, filed Nov. 10, 2006, which claims the benefit under 35 USC 119(e) of U.S. provisional application No. 60/782,257, entitled "Method of Ramp Stop Detection for VCM Velocity-Controlled Retract," filed on Mar. 14, 2006, the contents of both of which are hereby incorporated by reference in their entirety.

BACKGROUND OF THE INVENTION

The present invention relates to parking disk transducer heads, in particular when there is a power loss to a disk drive.

Disk drives typically have a number of disks with a number of transducer heads supported by an actuator structure. The actuator structure is controlled by a VCM (voice coil motor). The transducer heads float or fly on a cushion of air over the disk surface, with the air flow generated by the spinning disk. When the disk stops spinning, the transducer head will land on the disk surface, potentially damaging the transducer head and/or the data on the disk. Accordingly, before the disk is stopped spinning, the transducer head is moved away from the data area of the disk, typically to a landing or parking area, where a permanent magnet can hold the transducer head in place without requiring power. The parking area may be a ramp, which requires power to exert some force to move the transducer head up the ramp to a stop next to the magnet.

In the event of a power failure in a hard disk drive, the transducer head must be unloaded from the media and parked inside the ramp stop. This function is normally known as "emergency retract" and can be performed using a blind retract or a velocity controlled retract. Since the power supply is no longer providing power, the VCM either receives power from a reservoir capacitor or the back emf (electromotive force) from the spinning spindle motor for the disk. The back emf is the voltage generated by virtue of the motor spinning. With the power lost, the motor continues to spin until it stops, generating electricity in the form of the back emf which is used to perform certain power down operations.

For a blind retract, a pre-determined retract sequence is stored in a register before loading the transducer head onto the media. When the power fails, the motor controller will use this sequence to perform retract operations. Typically, a fixed value is used. Since the transducer head may be anywhere on the disk, the value must be enough to move the transducer head all the way across the disk to the parking ramp. When the transducer head is near the parking ramp, this usually ends up taking more power than needed, with the actuator being driven for a period of time after the transducer head is already parked. Another disadvantage of this method is that the velocity of the retract operation is not well controlled which will lead to a "head bounce back" reliability issue. That is, the actuator will literally bounce off the ramp stop, then will be powered into the ramp stop again, with a smaller bounce back, giving a bouncy or vibrating landing. In the worst case scenario, the actuator is not stopped at the ramp stop, which could lead to the transducer head dropping onto the media when the hard disk drive is moved. For a blind retract using a PWM (pulse width modulation) method to save power, the PWM frequency typically used is in the frequency spectrum that is audible to the human ear. Since the parking time is longer than necessary for many transducer head locations, this causes acoustic noise longer than is necessary.

For a velocity controlled retract, detection of the transducer head in the ramp stop can be determined by sensing the current for an extended period of time. In a closed velocity control loop, the VCM current is used to regulate the velocity. When the head hits the ramp stop, the head cannot move and maximum current is forced to the motor as it tries to move the head. By detecting when the current reaches a maximum level, and remains there for a period of time, the head reaching the ramp stop can be detected. To insure the head has truly landed after multiple possible bounce backs, a pre-determined time is needed that has the same acoustic noise problem as in the blind retract.

Figure 1:
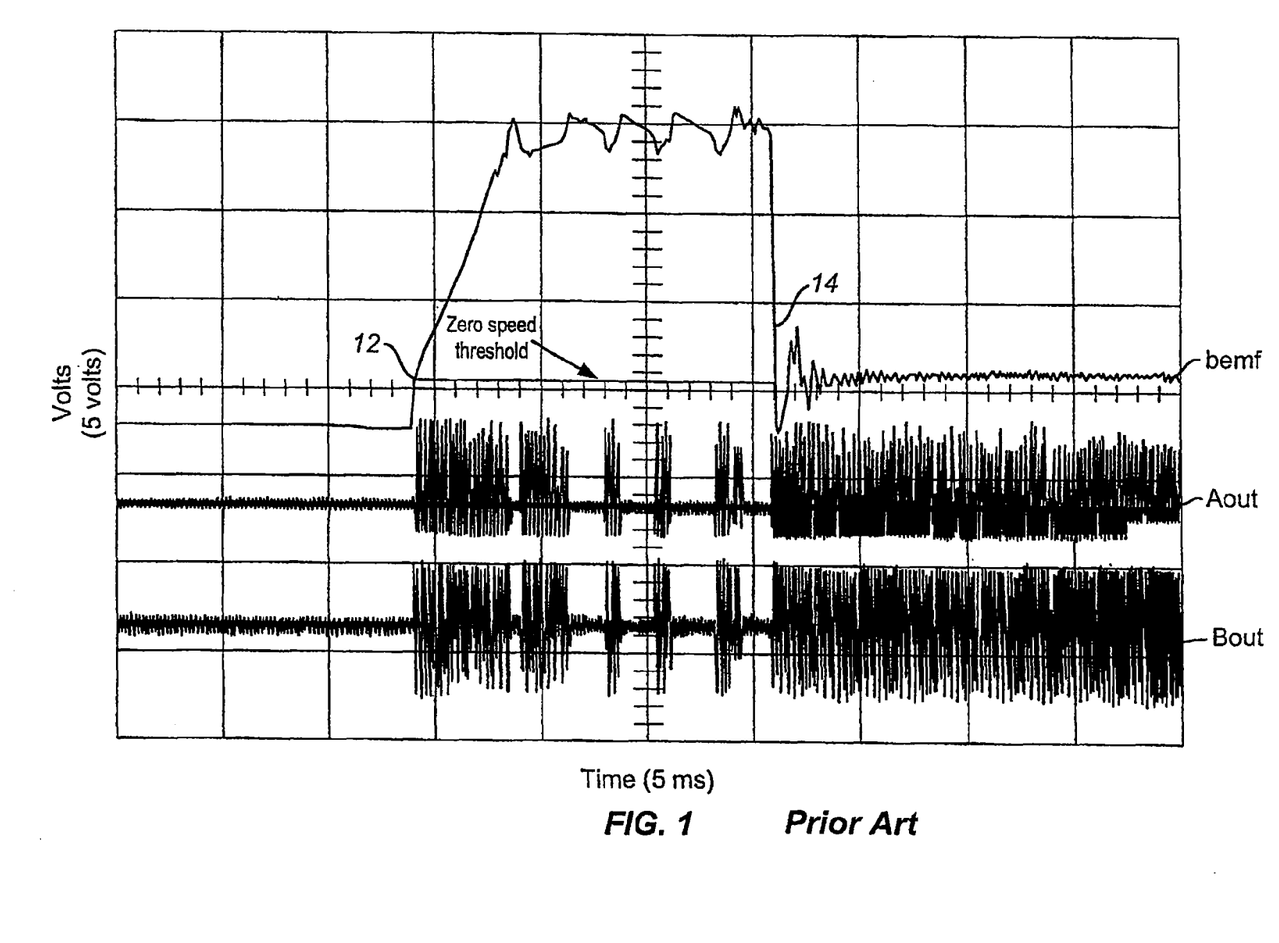
FIG. 1 shows a display of the waveforms corresponding to the VCM motor output and the back emf voltage for prior art methods of parking the head.

FIG. 1 illustrates Bout and Aout, the output voltage drive signals in two directions of the VCM motor. This shows an operation with velocity control with a fixed retraction, as described in a copending application of the same assignee and one of the inventors, application Ser. No. 60/740,103, filed Nov. 28, 2005, entitled "voice coil motor control system and method using pulse width modulation." Rather than showing the current monitor, FIG. 1 illustrates the characteristics of the back emf (bemf) for this prior method. In particular, at a point 12, power is lost and the power down sequence begins with power being applied to the VCM as illustrated by the Aout and Bout signals. The velocity of the actuator grows until it reaches a steady state value, and then sharply drops at a point 14. Point 14 reflects that the transducer head has hit the stop at the parking area, and thus is no longer moving and no longer generating the bemf. However, since the prior method continues to provide current to the VCM for a fixed retract period, the Aout and Bout signals continue to provide pulses for the period of time almost equal to the entire time period required to retract the head. As can be seen, line 14 crosses a zero speed threshold to indicate the point where, the head has stopped.

BRIEF SUMMARY OF THE INVENTION

The present invention provides a method and apparatus for controlling the parking of a head in a disk drive. A drive current is provided to a motor which controls movement of the head in a direction to move the head to a parking position. The arrival of the head at the parking position is detected. Upon this detection, a drive stop sequence is initiated to stop providing the drive current a short time after the head reaches the parking position. Thus, the present invention eliminates the need for a long buffer period of time after the head may reach the parking position from different start positions.

In one embodiment, it is determined whether the head has reached the parking position by monitoring the back emf (bemf) of the motor controlling the head, typically a VCM. The detection of a sharp decline in the bemf indicates the head has stopped.

In one embodiment, the drive stop sequence is simply a predetermined increment of time or number of pulses after it is detected that the head has arrived at the parking position. In another embodiment, the movement of the head continues to be monitored, to effectively detect a bouncing of the head off of the stop, and only turn off the current after at least a first bounce and rebound to the parking position.

In one embodiment, a method is provided for controlling the parking of a head in a disk drive. The method includes providing a drive current to a motor controlling movement of the head, in a direction to move the head to a parking position. The method includes maintaining the head within a predetermined velocity range; monitoring a back emf of said motor;

and detecting when said head has reached said parking position by one of (1) detecting a sharp drop in said back emf indicating a large speed reduction, or (2) detecting when the polarity of the back emf reverses. The method further includes initiating a drive stop sequence when said head has arrived at said parking position. The drive stop sequence comprises either (1) continuing to provide said drive current for a predetermined increment after said head has reached said parking position, or (2) monitoring a back emf of said motor after said back emf crosses a zero speed threshold indicating arrival of said head at said parking position; and detecting when a low speed threshold is subsequently crossed.

In one embodiment, means are provided for controlling the parking of a head in a disk drive. Included are means for providing a drive current to a motor controlling movement of said head, in a direction to move said head to a parking position. The means further includes means for maintaining said head within a predetermined velocity range; means for monitoring a back emf of said motor; and means for detecting when said head has reached said parking position by using one of (1) means for detecting a sharp drop in said back emf indicating a large speed reduction, or (2) means for detecting when the polarity of the back emf reverses. The means further includes means for initiating a drive stop sequence when said head has arrived at said parking position. The means for initiating a drive stop sequence comprises either (1) means for continuing to provide said drive current for a predetermined increment after said head has reached said parking position, or (2) means for monitoring a back emf of said motor after said back emf crosses a zero speed threshold indicating arrival of said head at said parking position; and means for detecting when a low speed threshold is subsequently crossed.

DETAILED DESCRIPTION OF THE INVENTION

Embodiments of the present invention provide a sequence of steps to reduce the power required for parking a transducer head. The transducer head is mounted on an actuator arm which is driven by a VCM. The sequence of steps includes detecting, from the back emf of the VCM, when the transducer head has reached the parking position.

Figure 2:
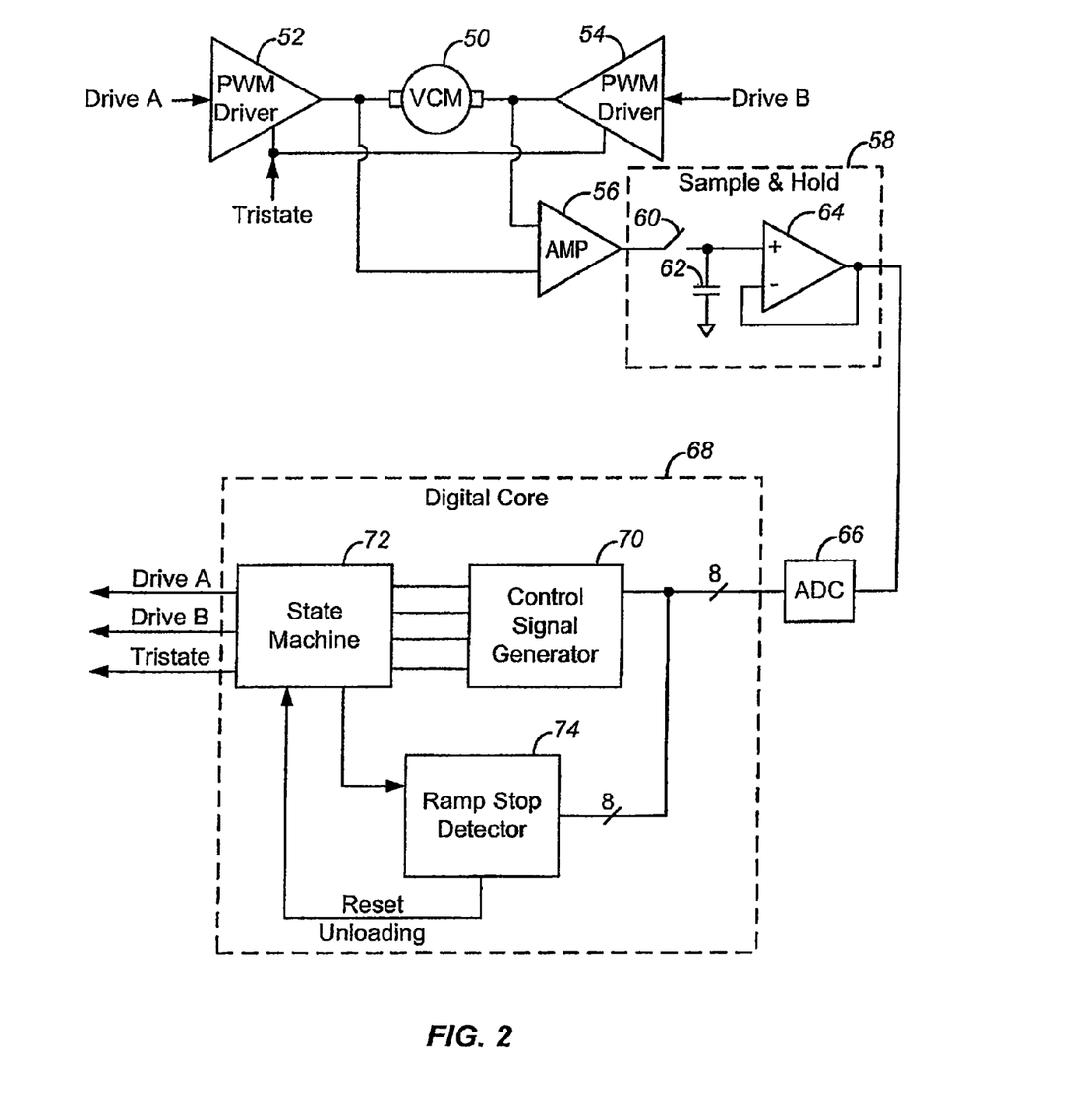
FIG. 2 is a block diagram of one embodiment of the circuitry implementing the present invention.

FIG. 2 is a block diagram of an embodiment of the present invention. A pulse width modulation (PWM) driver 52 provides current to VCM 50 in a first direction, while PWM driver 54 provides current to VCM 50 in a second direction. The first direction and the second direction may be viewed as a forward direction and a reverse direction. The VCM drives the transducer head in the forward or reverse direction. The drivers 52, 54 are controlled by drive A and drive B control signals, respectively. Also, a tristate control signal is used to tristate both drivers 52, 54. The bemf of VCM 50 is monitored by an amplifier 56, which provides a bemf signal to a sample and hold circuit 58. Sample and hold circuit 58 includes a switch 60, capacitor 62 and amplifier 64.

The output of the sample and hold circuit 58 is converted into a digital signal by analog-to-digital converter (ADC) 66. The digital value is provided to both a control signal generator 70 and a ramp stop detector 74 in a digital core 68. The control signal generator 70 provides multiple control signals, depending on the digital value, to a state machine 72. The state machine 72 provides outputs for controlling drive A, drive B, and tristate control signals at the appropriate times. In particular, these different control signals can be pulsed to provide the PWM effect, or can be turned off for periods of time to maintain a constant velocity for the transducer head. After the head stop has been properly detected, the tristate control signal can turn off the PWM drivers.

Figure 4:
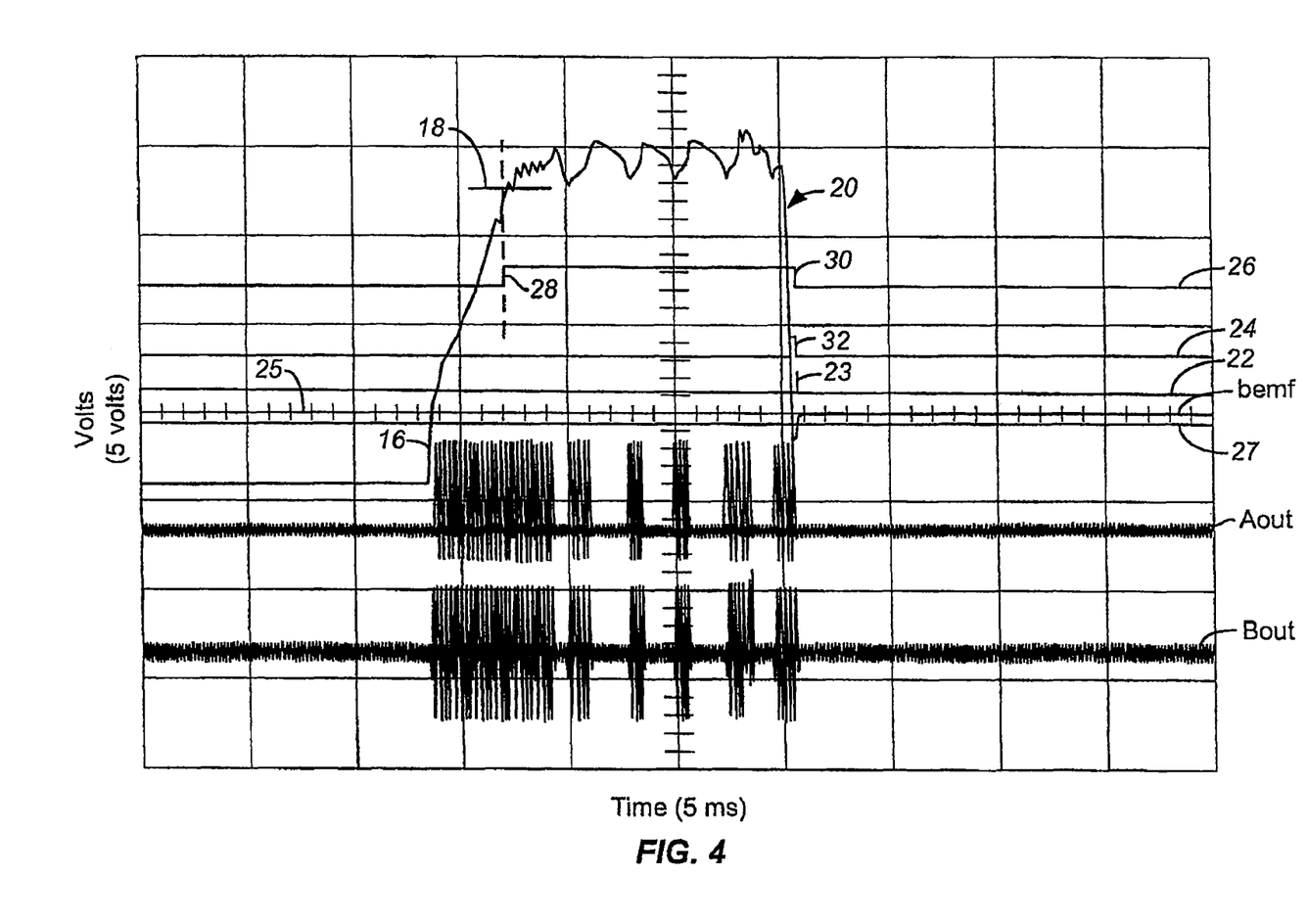
FIG. 4 shows a display of the signals of FIG. 1 during the operation of an embodiment of the present invention with stop detection.

Ramp stop detector 74 monitors the state machine state as well as the bemf signal (via the digital value), and provides a reset_unloading signal back to the state machine 72. Digital core 68 also operates as a velocity controller, to maintain the velocity of the head within a desired range, as illustrated in FIG. 4 below, during retraction.

Figure 3:
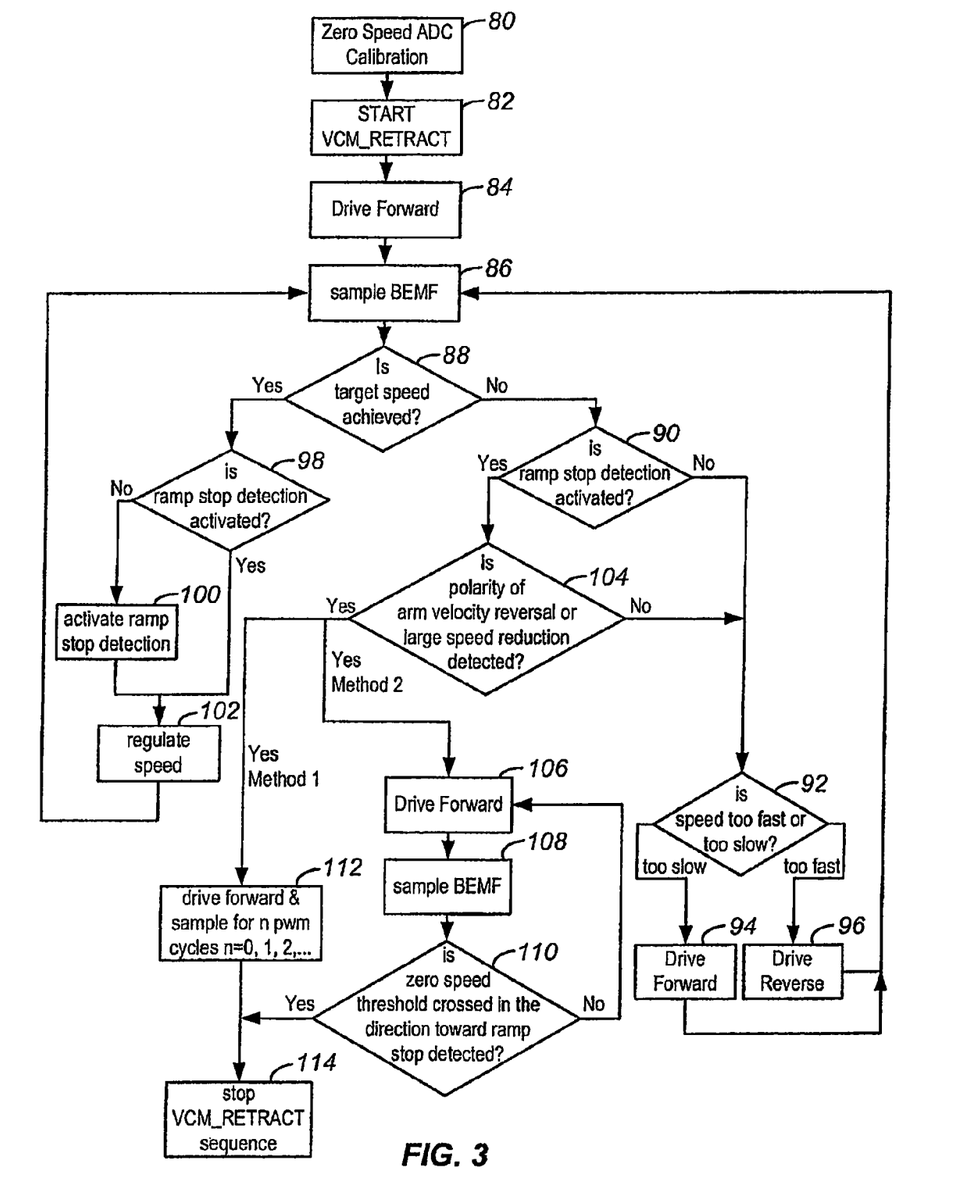
FIG. 3 is a flowchart illustrating embodiments of the method of the present invention.

FIG. 3 is a flowchart illustrating the operation of a circuit of FIG. 2, according to an embodiment of the invention. In a first step 80, the ADC 66 of FIG. 2 is first calibrated at a zero speed of the head before a retraction operation is performed. Step 82 indicates the start of a VCM retract operation. This would typically be triggered by a control signal indicating a power loss. Alternately, a retract operation may be initiated for other reasons, such as entering a low power mode. The transducer head is driven forward by providing drive current to VCM 50 at step 84 (under control of state machine 72 providing drive signal Drive A to PWM driver 52 of FIG. 2). While the transducer head is being driven forward, sample and hold circuit 58 constantly samples the bemf of VCM 50 (step 86).

State machine 72 controls Drive A to drive the transducer head to a ramp stop. The velocity of the head is monitored and controlled by varying Drive A. The velocity of the transducer head can be determined by any number of means (e.g., monitoring the amount of drive current, monitoring the bemf, etc.). If the target speed hasn't been achieved (step 88) and ramp stop detection hasn't been activated by ramp stop detector 74 (step 90), state machine 72 and control signal generator 70 will compare the speed to a desired speed (step 92) and either speed up the transducer head (step 94) or slow down the transducer head (step 96).

If a ramp stop detection has not been activated (step 90), the speed of the head is continues to be controlled by controlling the drive current to the VCM from driver 52. It is controlled in one embodiment to be within a desired range.

Once the target speed is achieved (step 88), Ramp stop detector 74 activates ramp stop detection (steps 98 and 100). The speed then continues to be regulated (step 102).

Returning to step 90, if ramp stop detection is activated when the target speed has not been achieved, or is no longer present, digital core 68 monitors the polarity of the actuator arm (transducer head) velocity (step 104) to determine if there has been a large speed reduction (or alternately a reversal of polarity of the bemf signal). If there is not, the speed continues to be monitored at step 92. If there has been a large speed reduction, one of two methods is used. In method one, the VCM continues to be driven for a predetermined time or number of PWM cycles (step 112), and then it is stopped (step 114). In the second method, the VCM is driven (step 106) and the bemf is monitored (step 108) until it is determined that the zero speed threshold or a low speed threshold has been crossed in the direction towards the ramp stop (step 110). In other words, until the zero speed or a low speed threshold has been recrossed in the direction indicating the initial polarity reversal in step 104. The sequence is then stopped (step 114).

FIG. 4 is a diagram illustrating the signals produced according to one embodiment of the present invention. As in FIG. 1, Aout and Bout signals are provided. The commencement of the power down sequence begins at point 16, with the back emf (bemf) signal rising to exceed a threshold 18, after which the velocity is controlled to be relatively steady state. When the bemf signal drops at a point 20 precipitously, this indicates that the transducer head has reached the parked position.

Signal 26 is the ramp stop sequence activation signal. It has a pulse with a beginning 28 and an ending point 30. As can be seen, when threshold 18 is crossed, the sequence for controlling a constant velocity begins (the start 28 of the ramp stop sequence activation pulse). At a point 30, the termination of the pulse causes termination of the current for signals Aout and Bout.

Also shown in FIG. 4 is a ramp stop polarity inversion detection signal 24. This provides a pulse 32 when the bemf signal drops below zero (line 25), indicating a polarity inversion, indicating that the head has stopped moving. Finally, pulse 23 of signal 22 is the ramp stop zero velocity detection signal, which indicates when the bemf signal recrosses a low speed threshold 27 just below zero, indicating that the head has rebounded and again been driven to the stop position.

Figure 5:
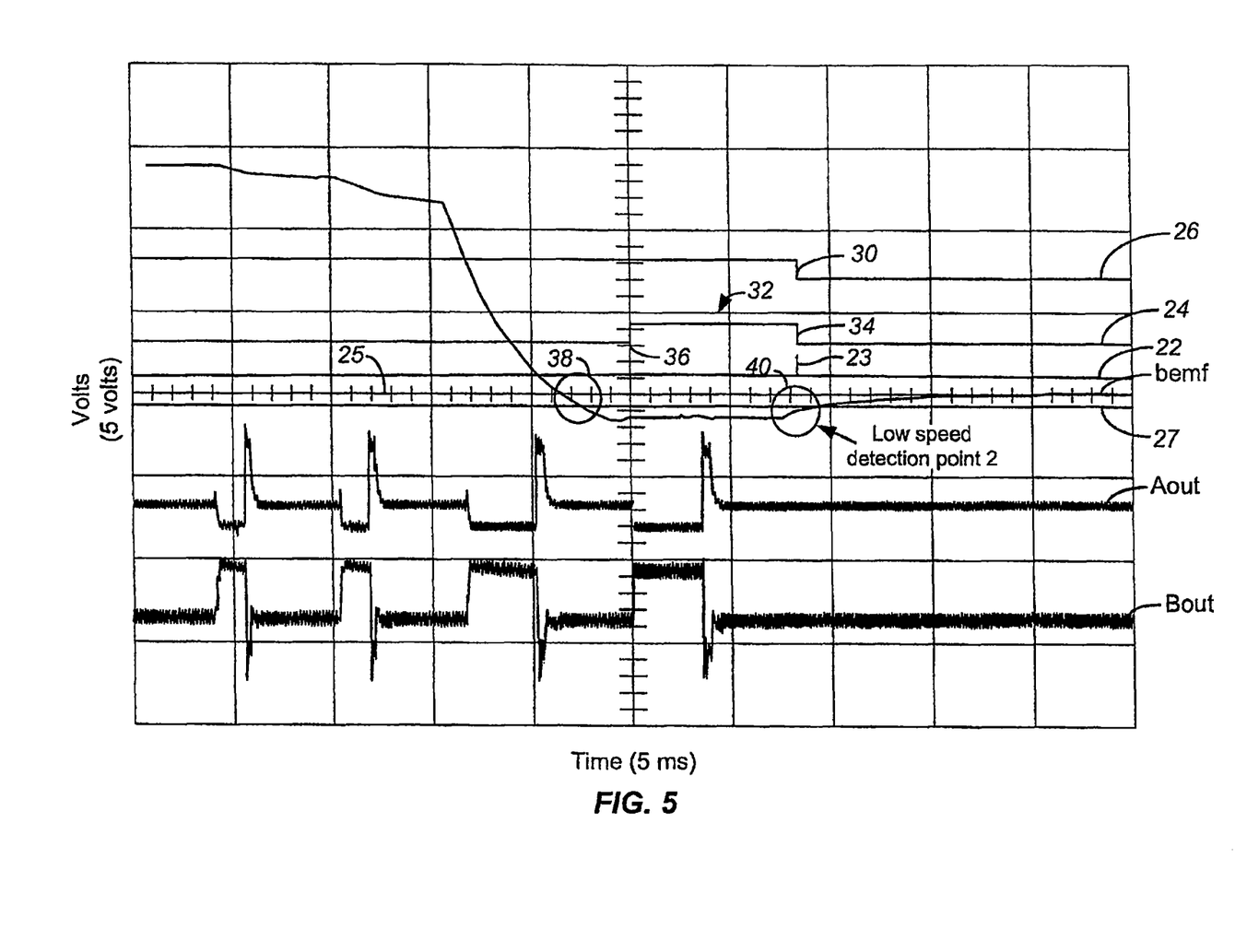
FIG. 5 is an expanded view of the stop detection portion of the display of FIG. 4.

FIG. 5 is an exploded diagram of the portion of FIG. 4 where zero velocity is detected. At a point 38, the bemf signal crosses the zero threshold 25. Pulse 32 is initiated with a rising edge 36 on the next clock edge after point 38. The bemf signal continues to be negative for awhile, then starts to climb again until it crosses low speed threshold 27 at point 40. This indicates that the head has bounced back. Crossing this threshold triggers pulse 23 of signal 22, which triggers the falling edge 34 of pulse 32, which in turn causes the falling edge 30 of signal 26. As shown, there is another PWM pulse for Aout and Bout after point 38.

From point 38 onward the arm unloading sequence can be stopped. There are two preferred methods of stopping the unloading sequence.

The first method is to stop the parking straight away after the polarity reversal, with or without a few more forward PWM cycles. However, if the head bounce back is too strong, the head may be out of the ramp stop.

The second method is to carry on the velocity control retract until zero or a low velocity is detected to ensure the head is firmly placed on the ramp stop. Point 40 in FIG. 5 indicates this second low speed detection point.

In summary, in one embodiment, the method of the present invention solves the problems of the prior art by monitoring the velocity profile of the VCM arm. At the time when the head reaches the ramp stop, the polarity of the velocity will be reversed due to the rebound of the arm. By detecting this reversal of velocity polarity, the end point of the unloading sequence can be determined.

Figure 6A:
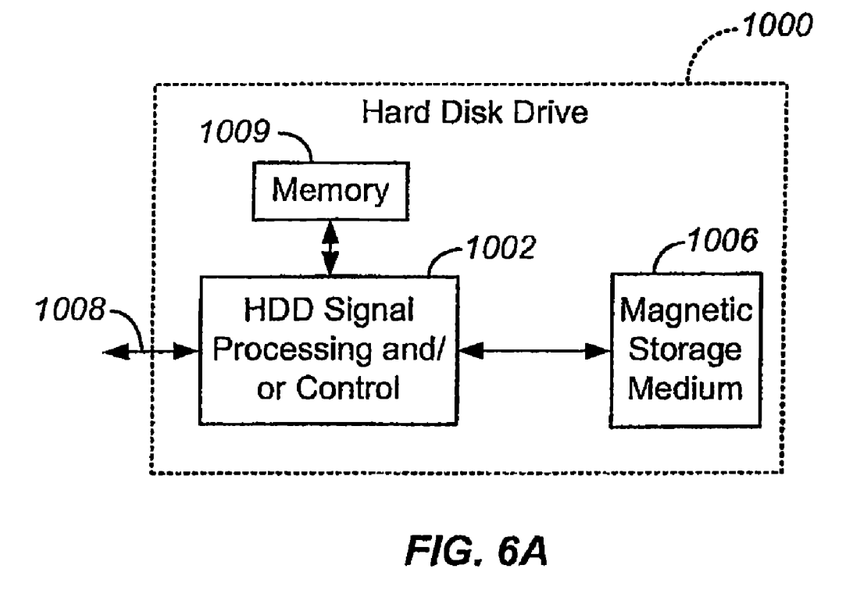
FIGS. 6A-6H illustrate various exemplary systems in which embodiments of the present invention are implemented.

FIGS. 6A-6G show various exemplary systems in which the present invention is incorporated are shown. FIG. 6A is an illustration showing the present invention embodied in a hard disk drive 1000. The present invention may be implemented in either or both signal processing and/or control circuits, which are generally identified in FIG. 6A at 1002. In some implementations, signal processing and/or control circuit 1002 and/or other circuits (not shown) in HDD 1000 may process data, perform coding and/or encryption, perform calculations, and/or format data that is output to and/or received from a magnetic storage medium 1006.

HDD 1000 may communicate with a host device (not shown) such as a computer, mobile computing devices such as personal digital assistants, cellular phones, media or MP3 players and the like, and/or other devices via one or more wired or wireless communication links 1008. HDD 1000 may be connected to memory 1009, such as random access memory (RAM), a low latency nonvolatile memory such as flash memory, read only memory (ROM) and/or other suitable electronic data storage.

Figure 6B:
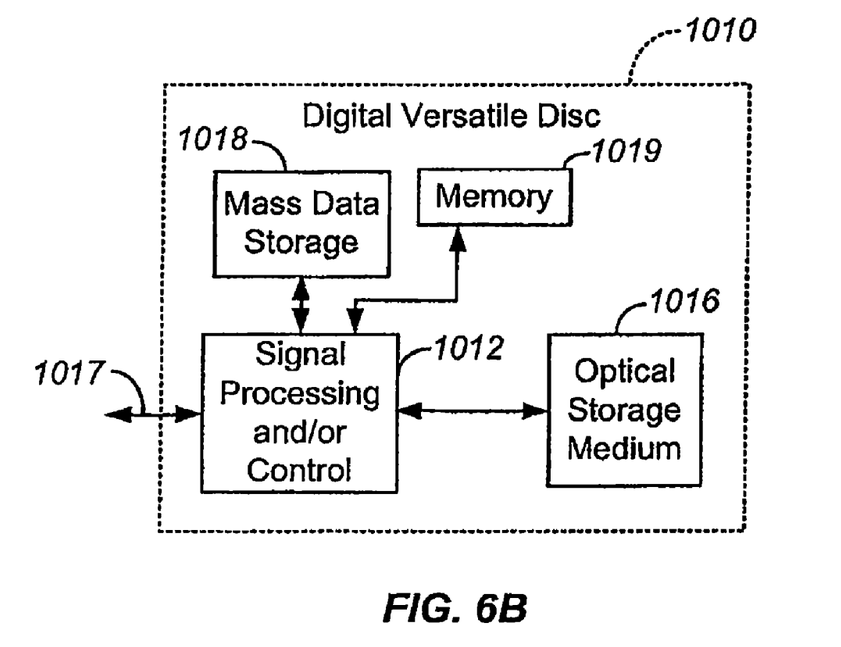

FIG. 6B is an illustration showing the present invention embodied in a digital versatile disc (DVD) drive 1010. The present invention may be implemented in either or both signal processing and/or control circuits, which are generally identified in FIG. 6B at 1012, and/or mass data storage 1018 of DVD drive 1010. Signal processing and/or control circuit 1012 and/or other circuits (not shown) in DVD 1010 may process data, perform coding and/or encryption, perform calculations, and/or format data that is read from and/or data written to an optical storage medium 1016. In some implementations, signal processing and/or control circuit 1012 and/or other circuits (not shown) in DVD 1010 can also perform other functions such as encoding and/or decoding and/or any other signal processing functions associated with a DVD drive.

DVD drive 1010 may communicate with an output device (not shown) such as a computer, television or other device via one or more wired or wireless communication links 1017. DVD 1010 may communicate with mass data storage 1018 that stores data in a nonvolatile manner. Mass data storage 1018 may include a hard disk drive (HDD) such as that shown in FIG. 6A. The HDD may be a mini HDD that includes one or more platters having a diameter that is smaller than approximately 1.8". DVD 1010 may be connected to memory 1019, such as RAM, ROM, low latency nonvolatile memory such as flash memory, and/or other suitable electronic data storage.

Figure 6C:
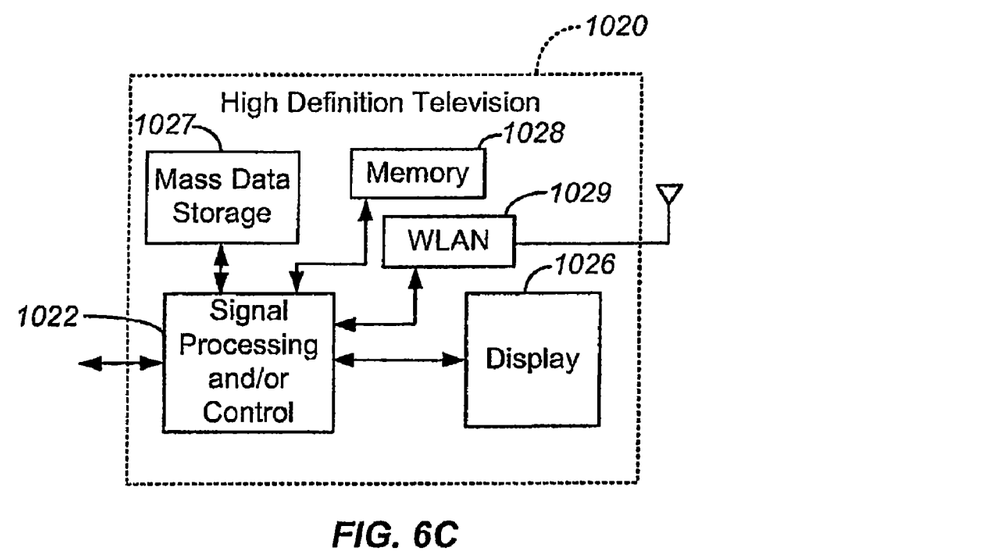

FIG. 6C is an illustration showing the present invention embodied in a high definition television (HDTV) 1020. The present invention may be implemented in either or both signal processing and/or control circuits, which are generally identified in FIG. 6C at 1022, a WLAN interface and/or mass data storage of the HDTV 1020. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with mass data storage 1027 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029.

Figure 6D:
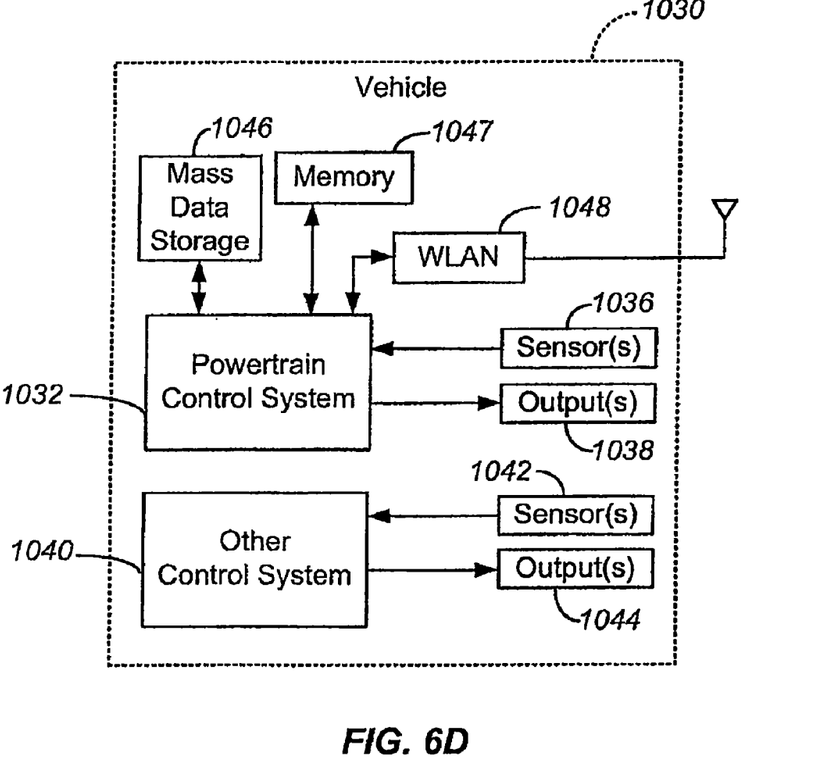

FIG. 6D is an illustration showing the present invention implemented in a control system of a vehicle 1030, a WLAN interface and/or mass data storage of the vehicle controlled system. A power train control system 1032 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1040 of vehicle 1030. Control system 1040 may likewise receive signals from input sensors 1042 and/or output control signals to one or more output devices 1044. In some implementations, control system 1040 may be part of an anti-lock braking system (ABS), a navigation system, a telemetric system, a vehicle telemetric system, a lane departure system, an adaptive cruise control system, a vehicle entertainment system such as a stereo, DVD, compact disc and the like. Still other implementations are contemplated.

Powertrain control system 1032 may communicate with mass data storage 1046 that stores data in a nonvolatile manner. Mass data storage 1046 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown).

Figure 6E:
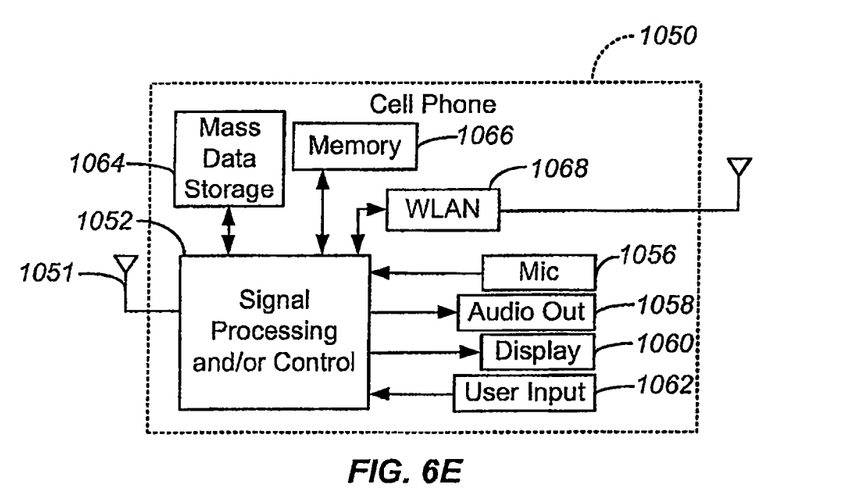

FIG. 6E is an illustration showing the present invention embodied in a cellular phone 1050 that may include a cellular antenna 1051. The present invention may be implemented in either or both signal processing and/or control circuits, which are generally identified in FIG. 6E at 1052, a WLAN interface and/or mass data storage of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068.

Figure 6F:
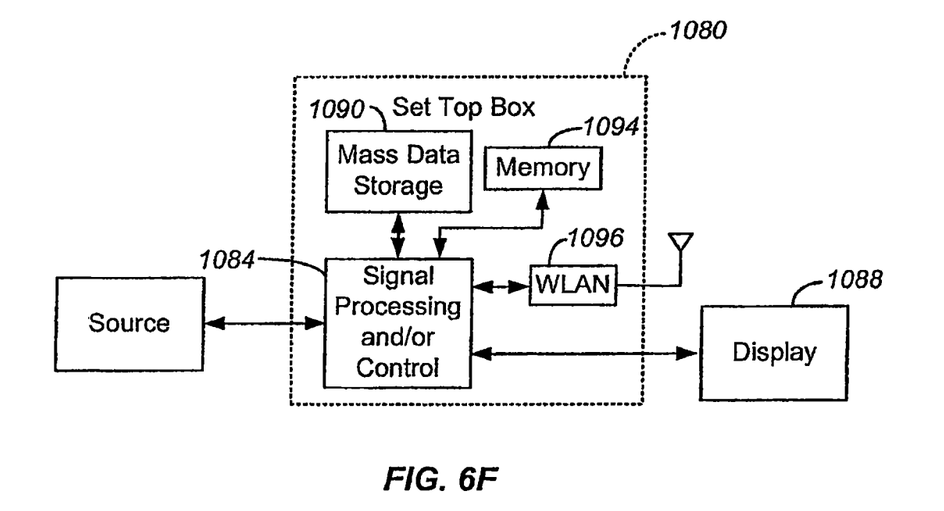

FIG. 6F is an illustration showing the present invention embodied in a set top box 1080. The present invention may be implemented in either or both signal processing and/or control circuits, which are generally identified in FIG. 6F at 1084, a WLAN interface and/or mass data storage of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner. Mass data storage 1090 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096.

Figure 6G:
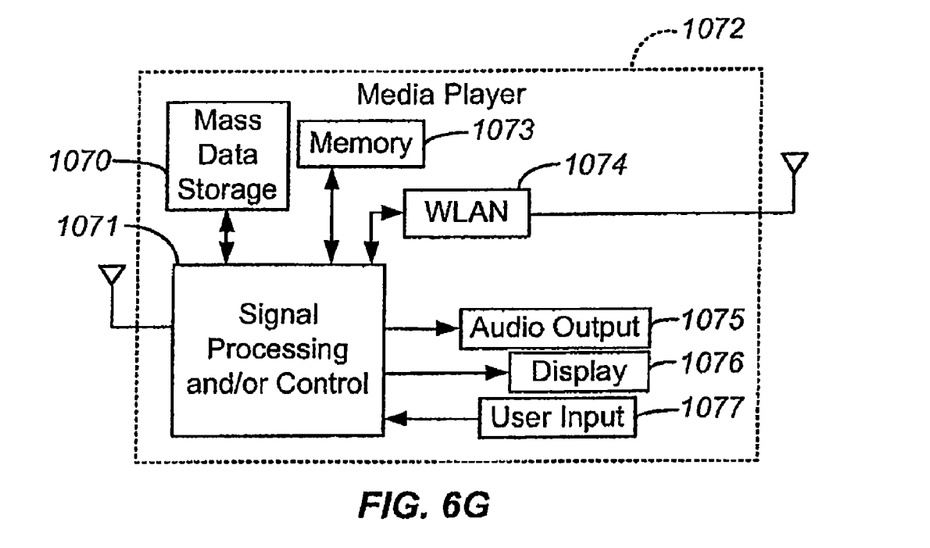

FIG. 6G is an illustration showing the present invention embodied in a media player 1072. The present invention may be implemented in either or both signal processing and/or control circuits, which are generally identified in FIG. 6G at 1071, a WLAN interface and/or mass data storage of the media player 1072. In some implementations, media player 1072 includes a display 1076 and/or a user input 1077 such as a keypad, touchpad and the like. In some implementations, media player 1072 may employ a graphical user interface (GUI) that typically employs menus, drop down menus, icons and/or a point-and-click interface via display 1076 and/or user input 1077. Media player 1072 further includes an audio output 1075 such as a speaker and/or audio output jack. Signal processing and/or control circuits 1071 and/or other circuits (not shown) of media player 1072 may process data, perform coding and/or encryption, perform calculations, format data and/or perform any other media player function.

Media player 1072 may communicate with mass data storage 1070 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 1072 may be connected to memory 1073 such as RAM, ROM, low latency nonvolatile memory such as flash memory and/or other suitable electronic data storage. Media player 1072 also may support connections with a WLAN via a WLAN network interface 1074.

Figure 6H:
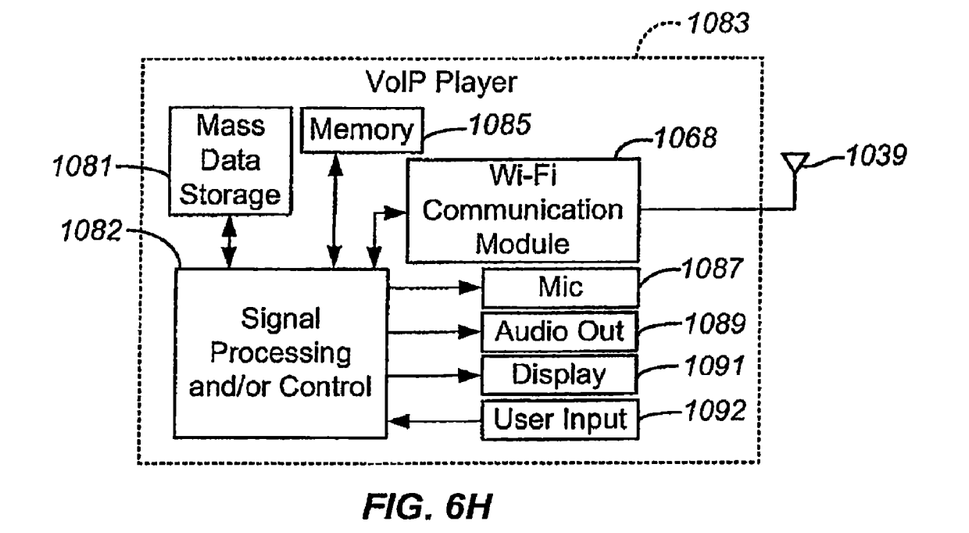

FIG. 6H is an illustration showing the present invention embodied in a Voice over Internet Protocol (VoIP) phone 1083 that may include an antenna 1039. The present invention may be implemented in either or both signal processing and/or control circuits, which are generally identified in FIG. 6H at 1082, a wireless interface and/or mass data storage of the VoIP phone 1083. In some implementations, VoIP phone 1083 includes, in part, a microphone 1087, an audio output 1089 such as a speaker and/or audio output jack, a display monitor 1091, an input device 1092 such as a keypad, pointing device, voice actuation and/or other input devices, and a Wireless Fidelity (Wi-Fi) communication module 1086. Signal processing and/or control circuits 1082 and/or other circuits (not shown) in VoIP phone 1083 may process data, perform coding and/or encryption, perform calculations, format data and/or perform other VoIP phone functions.

VoIP phone 1083 may communicate with mass data storage 1081 that stores data in a nonvolatile manner such as optical and/or magnetic storage devices, for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". VoIP phone 1083 may be connected to memory 1085, which may be a RAM, ROM, low latency nonvolatile memory such as flash memory and/or other suitable electronic data storage. VoIP phone 1083 is configured to establish communications link with a VoIP network (not shown) via Wi-Fi communication module 1086. Still other implementations in addition to those described above are contemplated.

As will be understood by those of skill in the art, the present invention may be embodied in other specific forms without departing from the essential characteristics thereof. For example, the bemf could be continued to be monitored for a short period after the drivers had been stopped to see if there is a rebound, with the drivers being reactivated briefly in the event a rebound is detected. Alternately, a negative bemf is possible with the signal going positive to indicate a ramp stop—the inversion of the signal or its steep transition is the common feature allowing identification of a ramp stop. Accordingly, the foregoing description is intended to be illustrative, but not limiting, of the scope of the invention which is set forth in the following claims.

What is claimed is:

1. A method for controlling movement of a head in a disk drive comprising:
    positioning the head at any of a plurality of positions;
    providing drive current to a motor after positioning the head;
    detecting information indicative of a position of the head after the drive current has been provided to the motor, the motor controlling the movement of the head; and
    generating a command that controls the movement of the head in response to the detected information.

2. The method of claim 1 wherein detecting the information comprises monitoring a back emf of the motor and detecting a drop in the back emf indicative of a speed reduction.

3. The method of claim 1 wherein detecting the information comprises detecting when a polarity of the back emf reverses.

4. The method of claim 1 wherein the command initiates a drive stop sequence that comprises continuing to provide the drive current for a predetermined increment after the head has reached a predetermined position.

5. The method of claim 1 wherein the command initiates a drive stop sequence, the drive stop sequence comprising:
    monitoring a back emf of the motor after the back emf crosses a zero speed threshold indicating arrival of the head at a predetermined position; and
    detecting when a predetermined threshold is subsequently crossed.

6. The method of claim 1 further comprising:
    controlling a velocity of the head while the drive current is provided to move the head to a predetermined position.

7. The method of claim 6 further comprising maintaining the head within a predetermined velocity range.

8. A method for controlling movement of a head in a disk drive comprising:
    positioning the head at any of a plurality of positions;
    providing drive current to a motor after positioning the head;
    monitoring a back emf of the motor controlling the movement of the head;
    detecting information indicative of a position of the head after the drive current has been provided to the motor based on detecting a change in the back emf; and
    generating a command that controls the movement of the head in response to the detected information.

9. The method of claim 8 wherein detecting the change in the back emf comprises one of detecting a drop in the back emf indicative of a speed reduction or detecting when a polarity of the back emf reverses.

10. The method of claim 8 wherein the command initiates a drive stop sequence in response to the detected information, the drive stop sequence comprising one of:
    continuing to provide the drive current for a predetermined increment after the head has reached a predetermined position, or
    monitoring a back emf of the motor after the back emf crosses a zero speed threshold indicating arrival of the head at the predetermined position, and detecting when a predetermined threshold is subsequently crossed.

11. An apparatus for controlling movement of a head in a disk drive comprising:
    a motor positioning the head at any of a plurality of positions;
    a driver proving drive current to a motor after positioning the head;
    a detector detecting information indicative of a position of the head after the drive current has been provided to the motor, the motor controlling the movement of the head; and
    a controller, responsive to the information detected by the detector, that generates a command that controls the movement of the head.

12. The apparatus of claim 11 wherein the detector comprises a back emf monitor that detects a drop in the back emf indicative of a speed reduction.

13. The apparatus of claim 11 wherein the detector detects when a polarity of the back emf of the motor reverses.

14. The apparatus of claim 11 wherein the command initiates a drive stop sequence that comprises continuing to provide the drive current for a predetermined increment after the head has reached a predetermined position.

15. The apparatus of claim 14 wherein the controller further comprises:
    a back emf monitor to monitor a back emf of the motor after the back emf crosses a zero speed threshold indicating arrival of the head at the predetermined position; and
    a detector to detect when a predetermined threshold is subsequently crossed.

16. The apparatus of claim 11 further comprising:
    a velocity controller to control a velocity of the head while the drive current is provided to move the head toward a predetermined position.

17. The apparatus of claim 16 wherein the velocity controller maintains the head within a predetermined velocity range.

18. An apparatus for controlling movement of a head in a disk drive comprising:
- a motor positioning the head at any of a plurality of positions;
- a driver providing drive current to the motor after positioning the head;
- a back emf monitor that monitors a back emf of the motor, the motor controlling the movement of the head;
- a detector that detects information indicative of a position of the head after the drive current has been provided to the motor, the detector detecting the information based on detecting a change in the back emf; and
- a controller, responsive to the information detected by the detector, that generates a command that controls the movement of the head.

19. The apparatus of claim 18 wherein the detector detects the information by one of:
- a drop in the back emf indicative of a speed reduction, or
- a polarity reversal of the back emf.

20. The apparatus of claim 18 wherein the command initiates a drive stop sequence in response to the detected information, the drive stop sequence comprising one of
- continuing to provide the drive current for a predetermined increment after the head has reached a predetermined position, or
- monitoring a back emf of the motor after the back emf crosses a zero speed threshold indicating arrival of the head at the predetermined position, and detecting when a predetermined threshold is subsequently crossed.

* * * * *